United States Patent
Wood

(10) Patent No.: US 9,485,053 B2
(45) Date of Patent: Nov. 1, 2016

(54) LONG-DISTANCE RAPIDIO PACKET DELIVERY

(71) Applicant: Integrated Device Technology, Inc., San Jose, CA (US)

(72) Inventor: Barry Everett Wood, Dunrobin (CA)

(73) Assignee: INTEGRATED DEVICE TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 14/327,333

(22) Filed: Jul. 9, 2014

(65) Prior Publication Data

US 2016/0013885 A1    Jan. 14, 2016

(51) Int. Cl.
*H04L 1/00* (2006.01)
*H04L 12/947* (2013.01)
*H04L 12/26* (2006.01)

(52) U.S. Cl.
CPC ........... *H04L 1/004* (2013.01); *H04L 43/0847* (2013.01); *H04L 49/25* (2013.01)

(58) Field of Classification Search
CPC ... H04L 1/004; H04L 49/25; H04L 43/0847; H04L 47/12
See application file for complete search history.

(56) References Cited

U.S. PATENT DOCUMENTS

| | | | |
|---|---|---|---|
| 7,107,359 B1 | 9/2006 | Burton et al. | |
| 7,796,629 B1 | 9/2010 | MacAdam et al. | |
| 7,974,278 B1* | 7/2011 | MacAdam | H04L 47/10 370/389 |
| 2004/0049600 A1 | 3/2004 | Boyd et al. | |
| 2006/0075057 A1 | 4/2006 | Gildea et al. | |
| 2007/0124554 A1 | 5/2007 | Allen et al. | |
| 2013/0223345 A1* | 8/2013 | Asterjadhi | H04L 69/04 370/328 |
| 2015/0244619 A1* | 8/2015 | Zheng | H04L 45/74 370/392 |

* cited by examiner

*Primary Examiner* — Mohammad Anwar
(74) *Attorney, Agent, or Firm* — Kenneth Glass; Glass & Associates

(57) ABSTRACT

The present invention provides a RapidIO device that includes a switch fabric and a port coupled to the switch fabric. The port is configured to establish a LP-Serial link with RapidIO endpoints, add packet headers having the same acknowledgement identifier to a plurality of contiguous packets and generate a link cyclical redundancy check value for the plurality of contiguous packets having the same acknowledgement identifier, the link cyclical redundancy check code computed to include the value of an acknowledgement identifier header. The port is configured to sequentially output the plurality of packets having the same acknowledgement identifier on the LP-Serial link. In addition, methods are disclosed for formatting bit streams in a RapidIO based communication system and communicating RapidIO packets.

21 Claims, 7 Drawing Sheets

LONG-DISTANCE RAPIDIO PACKET DELIVERY

BACKGROUND

RapidIO is an open standard based packet-switched fabric technology that has gained significant momentum recently in wireless, military and video applications due to its superior performance (Gbps/Watt/Port), superior flow control and fault-tolerance, ultra-low latency and guaranteed delivery attributes. The RapidIO protocol supports reliable transmission of packets using acknowledgement identifiers (ackID) that are used to track packet delivery. Acknowledge identifiers are not included in the calculation of Cyclic Redundancy Check (CRC) values, allowing acknowledge IDs to be changed on a link-by-link basis while CRC values remain constant.

With increasing link speeds, the number of packets 'in flight' over each link has increased, requiring more acknowledge identifiers for each link Increases in link distance also increase the number of packets "in flight" over each link, requiring even more acknowledgement identifiers for each link To accommodate increased link speeds, the RapidIO specification has increased the size of the acknowledge identifiers, resulting in more acknowledge identifiers for tracking packet delivery. In the RapidIO specification version 3.0 the size of acknowledge identifiers has been increased to twelve bits. However, further increases in the size of acknowledge identifiers are undesirable as this will result in significantly reduced bandwidth efficiency.

Accordingly, for high-speed communications using RapidIO, the maximum length of RapidIO links is limited by the number of acknowledge identifiers available to track packet delivery. This limitation has not been much of a problem in the past as most link distances have been relatively short. However, future applications will require longer RapidIO link distances.

Some Ethernet based protocols have been able to achieve long-link distance by using a sequence number for each packet. However, this method results in the number of bits per packet increasing with link speed, resulting in reduced bandwidth efficiency. This may work well for Ethernet based protocols having moderate to large-size payloads. However, RapidIO packets are designed to be bandwidth efficient for small (256 byte) payloads. For such small payloads, the resulting reduction in bandwidth efficiency makes this an undesirable solution.

Future high performance markets, such as data warehouses, may require links of up to 1 kilometer. The number of ackIDs available for 10/40 Gbps links is not sufficient to give line rate, under all circumstances, over a kilometer long link. As we look forward to faster lane speeds that may be attainable in the future, the number of acknowledgement identifiers needed increases to a number that cannot be supported by the existing RapidIO protocol.

Accordingly there is a need for a method and apparatus that provides bandwidth efficient communication over a RapidIO communication protocol and that will allow for high-link speed and increased-link distance.

SUMMARY

A Serial RapidIO (RapidIO) device is disclosed that includes a switch fabric and a port coupled to the switch fabric. The port is configured to establish a RapidIO LP-Serial link with RapidIO endpoints, to assign the same acknowledgement identifier to a plurality of contiguous packets and generate a link cyclical redundancy check (CRC) value for each of the plurality of contiguous packets having the same acknowledgement identifier. The link CRC value of each of the contiguous packets having the same acknowledgement identifier is computed to include the value of the acknowledgement identifier header prepended to each of the contiguous packets. The port is also configured to append each calculated link CRC value to a corresponding packet and sequentially output the plurality of packets having the same acknowledgement identifier on the LP-Serial link.

A method of formatting bit streams in a RapidIO based communication system is disclosed that includes performing an initialization process so as to form a RapidIO link between a first endpoint and a second endpoint of the RapidIO based communication system, the initialization process including indicating that repeat acknowledgement identifiers are allowed. The method further includes formatting first RapidIO bit stream at the first endpoint of the RapidIO communication system to include a plurality of packets having the same acknowledgement identifier. The method also includes formatting a second RapidIO bit stream at the second endpoint of the RapidIO communication system to include a packet accepted control symbol that acknowledges all of the packets having the same acknowledgement identifier.

The maximum length of RapidIO links has previously been limited by the number of acknowledgement identifiers that can be used to track packet delivery. The method and apparatus of the present invention removes this limitation, allowing for increased line speed and allowing the length of RapidIO links to be longer than is possible using conventional devices that conform to the current RapidIO specification. Because the method and apparatus of the present invention does not increase the size of the acknowledgement identifiers, bandwidth efficiency is not reduced. Accordingly, the method and apparatus of the present invention provides bandwidth efficient communication over a RapidIO communication protocol that will allow for high link speed and increased link distance.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

DETAILED DESCRIPTION

Figure 1:
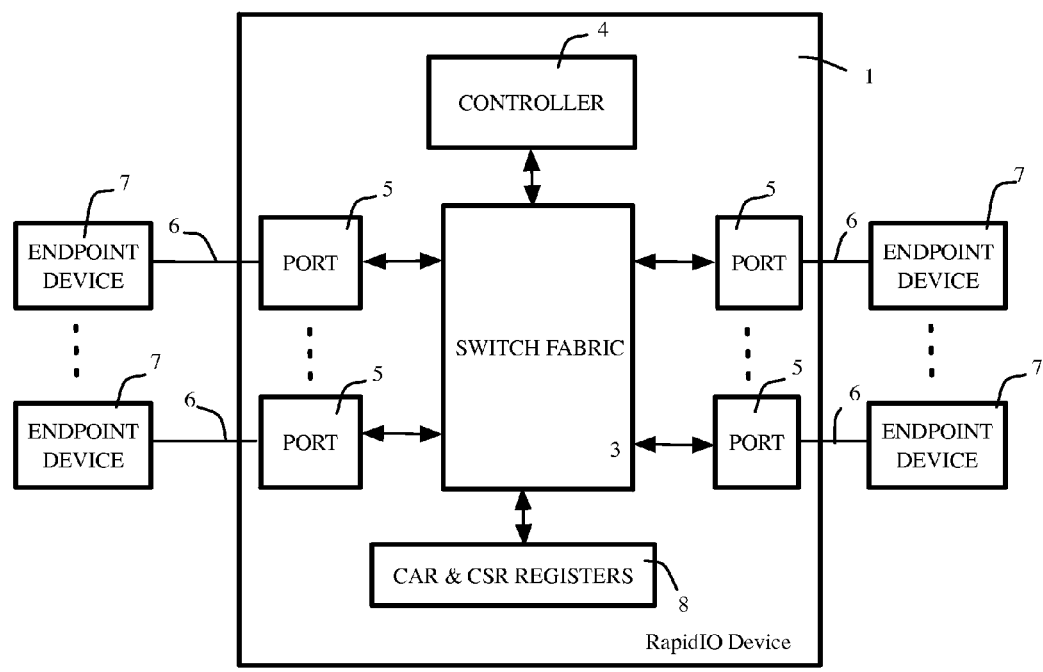
FIG. 1 illustrates a device that is operable to send and receive communications formatted in accordance with the RapidIO specification and that expands the number of acknowledgement identifiers by allowing for the use of repeat acknowledgement identifiers in accordance with an embodiment of the present invention.

FIG. 1 shows a Serial RapidIO device 1 that includes a controller 4 for controlling operations of RapidIO device 1. Switch fabric 3 is coupled to controller 4 and to ports 5. Each port 5 is coupled to an endpoint device 7 by two or more data lanes 6. In the embodiment shown in FIG. 2 each port 5 includes input and output (I/O) interface 12 that is coupled to encoder 9 and decoder 10. In the present embodiment encoder 9 and decoder 10 can perform 8 bit/10 bit or 64 bit/67 bit encoding/decoding. A packet processing engine 11 is coupled to encoder 9, to decoder 10 and to switch fabric 3. Each port 5 is operable for determining operation mode of the port (N× or 1× operation), detection of link states and clock difference tolerance.

Figure 2:
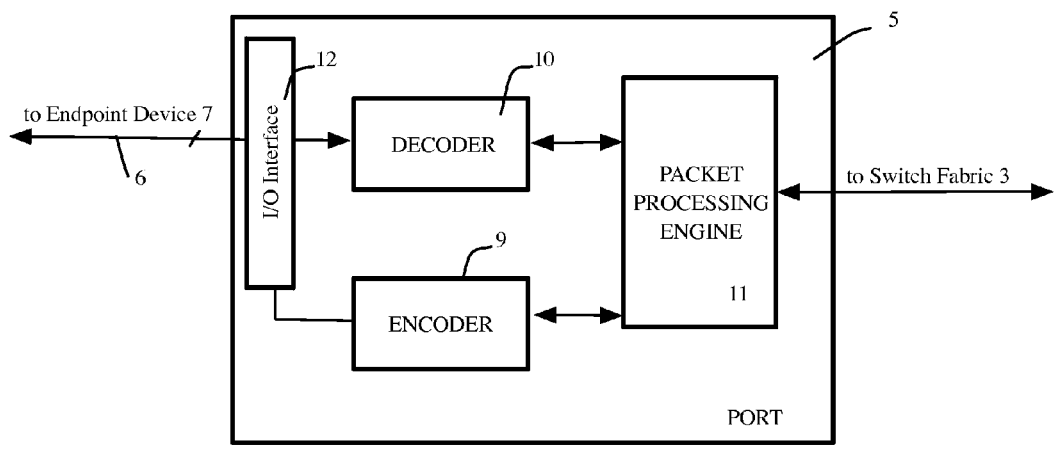
FIG. 2 illustrates a port of a device that is operable to send and receive communications formatted in accordance with the RapidIO specification and that expands the number of acknowledgement identifiers by allowing for the use of repeat acknowledgement identifiers in accordance with an embodiment of the present invention.

RapidIO device 1 of FIGS. 1-2 can be a Field Programmable Gate Array (FPGA) or Application Specific Integrated Circuit (ASIC) and may be implemented as a single semiconductor die or part of a multi-chip module. In the present embodiment RapidIO device 1 is an ASIC that is compliant with RapidIO Interconnect Specification, Revision 3.0, October, 2013, by the RapidIO Trade Association, Austin, Tex. (the "RapidIO Specification"), with data lanes 6 configured as Baud Rate Class 3 links running IDLE3 and Control Symbol 64. Data lanes 6 can also be configured as Baud Rate Class 1 or Baud Rate Class 2 links running IDLE1 or IDLE 2 and Control System 24 or Control System 48. In the present embodiment each port 5 can include one or more I/O interface 12, packet processing engine 11, encoder 9 and decoder 10 and can transmit and receive on 1×, 2× 4×, 8 ×, or 16×data lanes 6. However, RapidIO device 1 can also incorporate future RapidIO specifications and can accommodate different numbers of data lanes, such as, for example, 10× data lanes.

In the present embodiment RapidIO device 1 includes device access routine (DAR) interfaces defined by the Software System Bring Up Specification 3.0 such that information on RapidIO device 1 is included in session management advertisement CSR and CAR registers 8. Session management advertisement CSR registers 8 include a Session Management Protocol Register Write Enable CSR, Session Management Attribute Range CSR, and Component Tag CSR registers.

Figure 3:
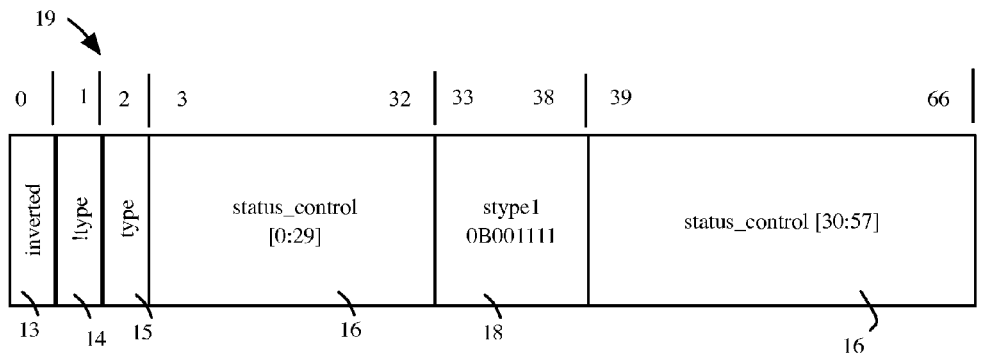
FIG. 3 illustrates the format of a Status/Control control codeword in accordance with the RapidIO specification.

Control Symbol 64 status/control control codewords are used in the session management protocol to communicate link level information between link partners, including link training control, link initialization and asymmetric link width control. FIG. 3 shows the format of a status/control codeword 19 that includes an inverted bit (inverted) 13, a type bit (type) 14 that has a value of "0", an inverse type bit (!type) 15 that has a value of "1" and a 64 bit data field 16 that that includes a stype1 field 18 having a value of ob001111 that indicates that the data_field 16 contains status/control data.

Ports 5, data lanes 6 and endpoint devices 7 comply with Part 6: LP-Serial Physical Layer Specification of the RapidIO Specification such that ports 5 are coupled to endpoints 7 so as to establish LP-Serial links, with each port 5 operable to be initialized (the port_initialized state) and operable to be initialized as a part of a link (link_initialized). Once ports 5 and links have been initialized, each port 5 communicates with its corresponding endpoint device 7 in accordance with the LP-Serial protocol of the RapidIO specification, providing link level flow and error detection and recovery.

I/O interface 12 includes a deserializer that is operable to align bitstreams received at I/O interface 12 to 67-bit codeword boundaries. For receive data lanes 6, port 5 operates as an input port such that received bitstreams from endpoint device 7 are deserialized and aligned into encoded codewords that are coupled to 64 bit/67 bit decoder 10. Decoder 10 is operable to decode the received 67-bit encoded codewords into 64 bit codewords and a control bit that indicates whether the codeword is a data codeword or a control codeword. Packet processing engine 11 is operable to mark characters decoded from codewords having errors as invalid, remove link CRC-32 and padding, align character streams to eliminate skew, destripe character streams, descramble incoming data streams, and deliver the character stream of packets and control codewords to other circuitry of RapidIO device 1 via switch fabric 3.

For transmit data lanes 6, port 5 operates as an output port. Packet processing engine 11 is operable to add link headers to outgoing packets received from switch fabric 3 to generate data codewords. Packet processing engine 11 is also operable to generate control codewords that include one or more control symbol and couple the data codewords and control codewords to encoder 9, along with a control bit that indicates whether or not each codeword is a data codeword or a control codeword. Encoder 9 is operable to encode outgoing packets into 67-bit encoded codewords that are coupled to I/O interface 12. The serializer of I/O interface 12 is operable to serialize the 67-bit encoded codewords to generate a stream of 67-bit encoded codewords that are output as a bitstream on the transmit data lane 6. Packet processing engine 11 is also operable to append link CRC-32 and padding, deque packets and control symbols awaiting transmission to generate the transmit character stream, stripe transmit character streams, scramble the outgoing data stream, generate and insert control symbols and idle sequences.

Figure 4:
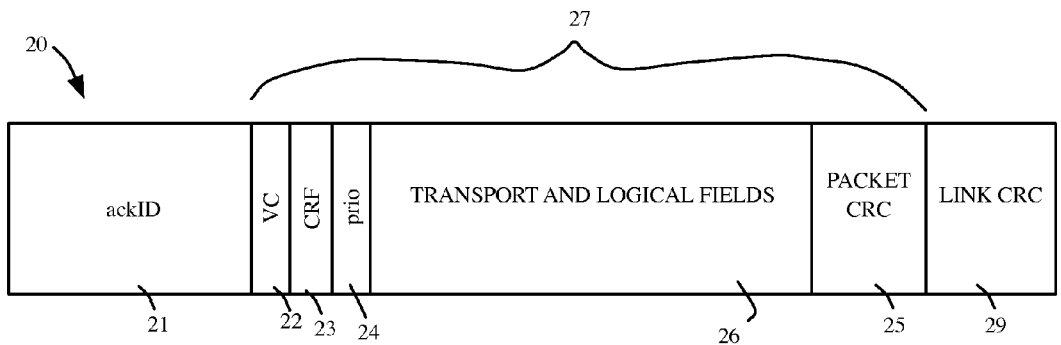
FIG. 4 illustrates the data packet format in the RapidIO specification for a data packet having a packet length, exclusive of CRC, of 80 bytes or less.
Figure 5:
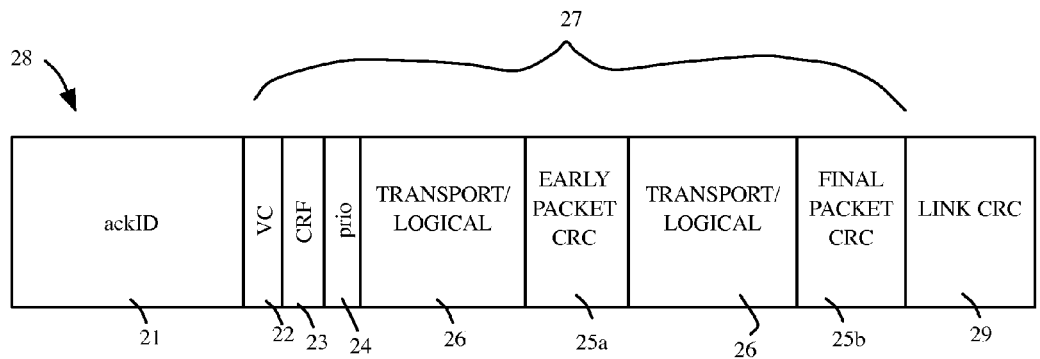
FIG. 5 illustrates the data packet format in the RapidIO specification for a data packet having a packet length, exclusive of CRC, of greater than 80 bytes.

For each outgoing data packet 20, packet processing engine 11 is operable to perform a cyclic redundancy check (CRC) function to calculate a packet CRC value 25. For packets 20 having a length, exclusive of CRC of 80 bytes or less, a single packet CRC value 25 is appended to the end of transport and logical layer fields 26 as shown in FIG. 4. However, for packets 30 having a length, exclusive of CRC that is greater than 80 bytes as shown in FIG. 5, an early packet CRC value 25*a* is appended after the first 80 bytes and a final packet CRC value 25*b* is appended to the end of the transport and logical layer fields 26. The final packet CRC value 25*b* is a continuation of the early packet CRC value 25*a*, with the early packet CRC value 25*a* included in the running calculation. The early packet CRC value 25*a* can be used to validate the header of a large packet and start processing the data before the rest of the packet has been received, allowing for faster packet processing.

Referring now to FIG. 4, for each outgoing LP-Serial data packet 20 that includes transport layer fields and logic layer fields 26 shown in FIG. 5 packet processing engine 11 is operable to append a link header that includes physical layer header fields 21-24. The link header includes a virtual channel (VC) bit 22, a critical request flow (CRF) bit 23, a priority field (prio) 24 and an acknowledgement identifier header field containing an acknowledgement identifier header 21. Acknowledgement identifiers (ackID) are monotonically increasing sequential values that uniquely identify packets in the transmitter data stream. Acknowledgement identifiers are found in both data packets and control codewords, and are used to assure reliable packet delivery.

Control System 64 acknowledgement identifiers have 12 bits. The six most significant bits of the Control System 64 acknowledgement identifier are included in a control symbol preceeding the packet and are referred to hereinafter as "control bits." The link header includes the six least significant bits. The term "acknowledgement identifier header," as used in the present application, is defined as those bits in the link header that indicate the acknowledgement identifier. Control System 24 acknowledgement identifiers have five bits and Control System 48 acknowledgement identifiers have 6 bits, with all of the bits of the acknowledgement identifier included in the link packet header. The acknowledgement identifier header for Control System 48 includes all six acknowledgement identifier bits and the Control System 24 acknowledgement identifier header includes the five bits of the acknowledgement identifier and a rightmost bit having a value of "0." The acknowledgement identifier header for Control System 64 includes the six least significant bits of the acknowledgement identifier.

For each outgoing data packet 20, 30 packet processing engine 11 is operable to perform a link CRC function to calculate a link CRC value 29. The link CRC operation is performed as specified in Part 6: LP-Serial Physical Layer Specification of the RapidIO Specification, using a 32 bit CRC code initialized to all logic 1's at the beginning of each packet with the six bits of the acknowledgement identifier header treated as logic 0's in the CRC calculation. In the present embodiment the link CRC code is the IEEE 802.3-2008 (Section 1) clause 3.2.9 polynomial and packet processing engine 11 is operable append the generated link CRC value 29 to the packet prior to encoding the resulting data packet 20 using 64 bit/67 bit encoding.

Link CRC value 29 is calculated on the logic layer packet and added transport layer fields and all of the fields of the link header except for the acknowledgement identifier header. More particularly, the link CRC value is calculated on fields 22-26 shown in FIGS. 4-5 as indicated by bracket 27, and does not include acknowledgement identifier header 21. In the present embodiment packet processing engine 11 is operable append the 32-bit generated link CRC value 29 to the packet prior to encoding the resulting data packet using 64 bit/67 bit encoding.

Figure 6:
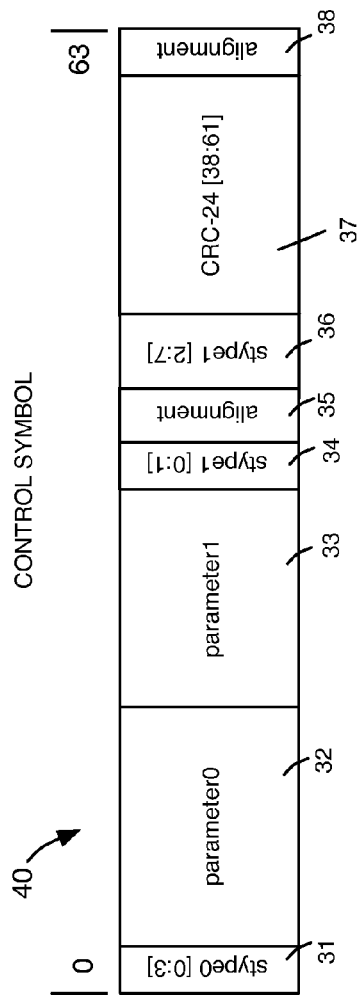
FIG. 6 illustrates the format of a control symbol in accordance with the RapidIO specification.

Control Symbol 64 control codewords encode 64 bits of control information or some combination of data and control information and are encoded as 64 bit/67 bit control codewords. FIG. 6 shows the data bit format of a Control Symbol 64 control symbol 40 to include stype0 field 31, parameter0 field 32 and parameter1 field 33. Parameter0 field 32 and parameter1 field 33 are 12-bit fields that are used by the stype0 function, with the function encoded in the stype0 Field 31. The function encoded in stype1 field 34 can be a request to the receiving port or can include a transmission delimiter. Stype1 function field 36 defines stype1 functions such as, Stomp, End-of-packet-unpadded, End-of-packet-padded, Restart-from retry, Link-request-reset-port, Link-request/Reset-device, Link-request/Port status, Multicast event, Loop-timing-request, NOP-ignore, Start-of-packet unpadded and Start-of-packet-padded.

When control symbol 40 is a Control Symbol 64 start of packet control symbol, stype1 field 36 includes six acknowledgement identifier bits. Alignment fields 35 and 38 are used to bring the number of bits to 64 bits, and are positioned so as to allow a Control Symbol 64 to be split across codewords. Cyclic Redundancy Check (CRC) field 37 includes a 24-bit CRC value computed on control bits 0 through 37, including fields 31-36 of control symbol 40.

Figure 7:
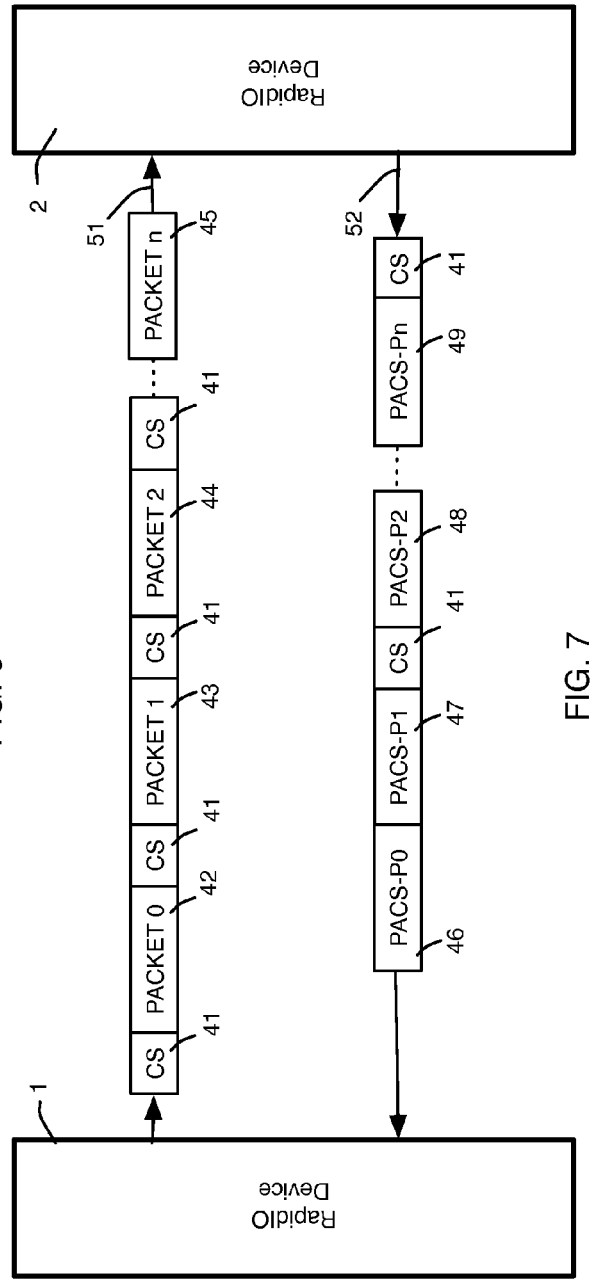
FIG. 7 illustrates a LP-serial link that is established between a first RapidIO endpoint of a first RapidIO device and a second RapidIO endpoint of a second RapidIO device, and that includes a first RapidIO bit stream and a second RapidIO bit stream, and illustrates packets and control symbols sent from the first RapidIO device to the second RapidIO device in the first bit stream and corresponding packet accepted control symbols sent from the second RapidIO device back to the first endpoint of the first RapidIO device in the second RapidIO bit stream in accordance with an embodiment of the present invention.

As previously discussed, the link protocol uses acknowledgement to monitor packet transmission, with each packet transmitted across a RapidIO LP-serial link acknowledged by the receiving port with a packet acknowledgement control symbol. Packets are acknowledged in the order in which they were transmitted (ackID order) as shown in FIG. 7. More particularly, when RapidIO device 1 is coupled to a RapidIO device 2 such that RapidIO device 1 includes a transmit lane 51 and receive lane 52 that form a single LP-Serial link with RapidIO device 2, a first packet (packet 0) 42 transmitted from RapidIO device 1 will include a first acknowledgement identifier (e.g., having a decimal value of 801), and the second packet (packet 1) 43 transmitted from RapidIO device 1 will include a second acknowledgement identifier that is incremented by one (e.g., having a value of 802) and the third packet 44 transmitted from RapidIO device 1 (packet 2) will include a third acknowledgement identifier that is incremented by one (e.g., having a value of 803), with each subsequent packet in having a different acknowledgement identifier from the previous packet and that is incremented by a value of one from that of the previous packet to the nth packet 45. Control symbols such as exemplary control symbols 41 delimit packets 42-45 and provide for configuration and control of the RapidIO Serial Data link Each packet is usually acknowledged by a single packet-acknowledgement control symbol that includes the acknowledgement identifier of the packet being acknowledged. For example, a first packet-accepted control symbol (PACS-P0) 46 may include the acknowledgement identifier in the first packet (packet 0) that may be a twelve-bit value having a binary numerical value of 801, the second packet-accepted control symbol (PACS-P1) 47 may include the acknowledgement identifier in the second packet (packet 1) having a value of 802 and third packet-accepted control symbol (PACS-P2) 48 may include the acknowledgement identifier in the third packet (packet 2) having a value of 803, and the nth packet-accepted control symbol (PACS-Pn) 49 may include the acknowledgement identifier in the nth packet (packet n) 45 having a value of n+1.

Control Symbol 64 allows for Packet Accepted control symbols to acknowledge multiple packets, with the configuration controlled by the Port n Latency CSRs such that a Packet Accepted control symbol can acknowledge all outstanding packets up to and including the packet acknowledgement identifier included in the packet-accepted control symbol that is acknowledging the multiple packets. For example, in the embodiment shown in FIG. 7, packet-accepted control symbols 46 and 47 need not be sent and packet-accepted control symbol 48 could be sent that would include an acknowledgement identifier of packet 44 (e.g., having a value of 803) so as to acknowledge packets 42-44.

When a LP-Serial link has been established as disclosed in the RapidIO specification, the length of each data lane 6 in the LP-Serial link is limited by the number of acknowledgement identifiers that can be assigned. More particularly, as a result in the high speed of Baud Rate Class 3 links, the increasing number of data lanes that can be active at any one time and the length of the data lanes 6, there may not be enough acknowledgement identifiers available, limiting the length of data lanes 51-52. When data lanes 6 are class 1 or class 2 links, the number of acknowledgement identifiers is limited by the size of the acknowledgement identifier field in the RapidIO specification such that there may not be enough acknowledgement identifiers available, further limiting the length of data lanes 51-52.

Figure 8:
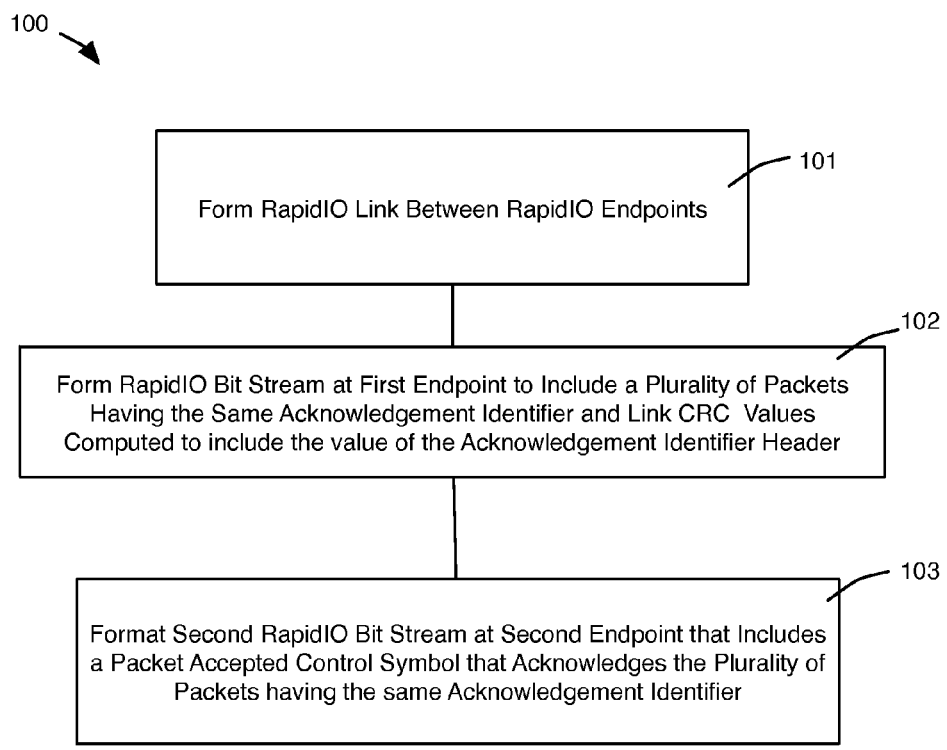
FIG. 8 illustrates a method of formatting bit streams in a RapidIO based communication system in accordance with an embodiment of the present invention.

FIG. 8 illustrates a method 100 for formatting bit streams in a RapidIO based communication system. As shown by step 101, a RapidIO link is formed between a first endpoint and a second endpoint of a RapidIO based communication system.

As shown by step 102, a first RapidIO bit stream is formatted at the first endpoint of the RapidIO communication system to include a plurality of packets having the same acknowledgement identifier and having a cyclical redundancy check value that is computed to include the value of the acknowledgement identifier header.

Figure 9:
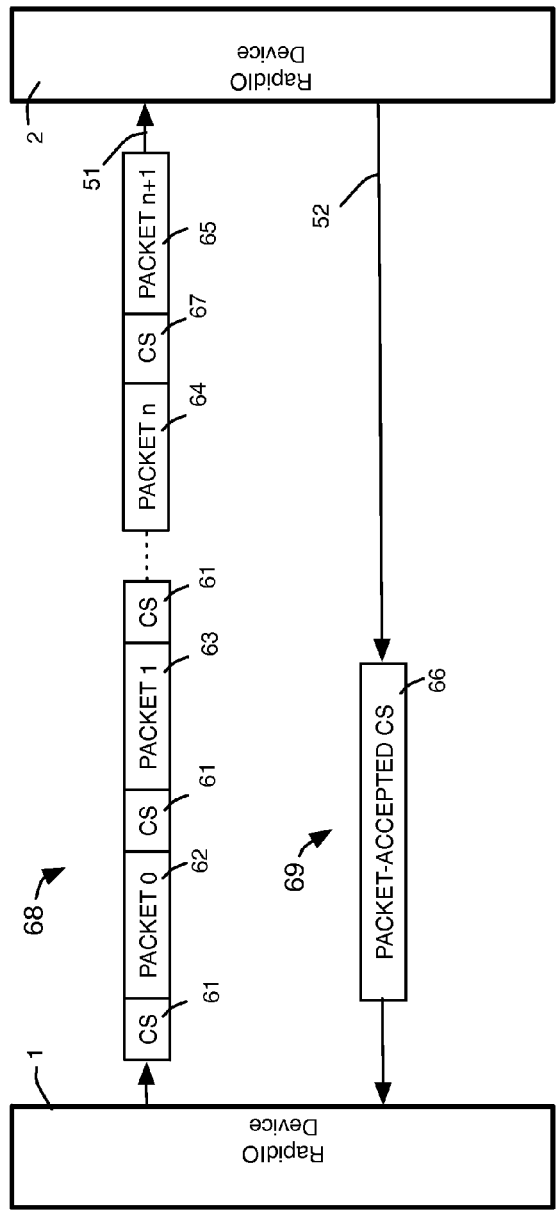
FIG. 9 illustrates a LP-serial link that is established between a first RapidIO endpoint of a first RapidIO device and a second RapidIO endpoint of a second RapidIO device, and that includes a first RapidIO bit stream and a second RapidIO bit stream, and illustrates packets and control symbols sent from the first RapidIO device to the second RapidIO device in the first bit stream and a corresponding packet accepted control symbol sent from the second RapidIO device back to the first endpoint of the first RapidIO device in the second RapidIO bit stream in accordance with an embodiment of the present invention.

In the embodiment shown in FIG. 9, RapidIO device 1 is operable to generate a first RapidIO bit stream 68 on data lane 51 that includes packets 62-64 having the same acknowledgement identifier. For example, in an embodiment in which an acknowledgement identifier assigned to the first packet (packet 0) 62 has a decimal value of 801, the acknowledgement identifier value assigned to the immediately succeeding packet, shown as second packet (packet 1) 63 will have the same acknowledgement identifier decimal value of 801 as will all subsequent packets up to and including the n$^{th}$ packet (packet n) 64.

In the present embodiment the link CRC-32 function is performed to include the acknowledgement identifier header in the calculation of the link CRC value. Accordingly, the transport and logical fields 26 of packets 61-65 conform to a packet format as specified in RapidIO Interconnect Specification Rev. 3.0, October 2013. With the exception of the fact that the acknowledgement identifiers of packets 61-64 are not monotonically increasing values as required by the RapidIO specification and the inclusion of the acknowledgement identifier header in the calculation of the link CRC value for packets 61-64, packets 61-64 conform to the RapidIO specification version 3.0, October 2013 and in particular, RapidIO interconnect Specification Part 6: LP-Serial Physical specification version 3.0, October 2013.

As shown by step 103, a second RapidIO bit stream 69 is formatted at the second endpoint of the RapidIO communication system to include a packet accepted control symbol that acknowledges all of the plurality of packets having the same acknowledgement identifier. In the embodiment shown in FIG. 9, RapidIO device 2 is operable to generate RapidIO bitstream 69 on data lane 52 that includes packet accepted control symbol 66 that acknowledges all of the packets 62-64 having the same acknowledgement identifier (packets 0-packet n).

Figure 11:
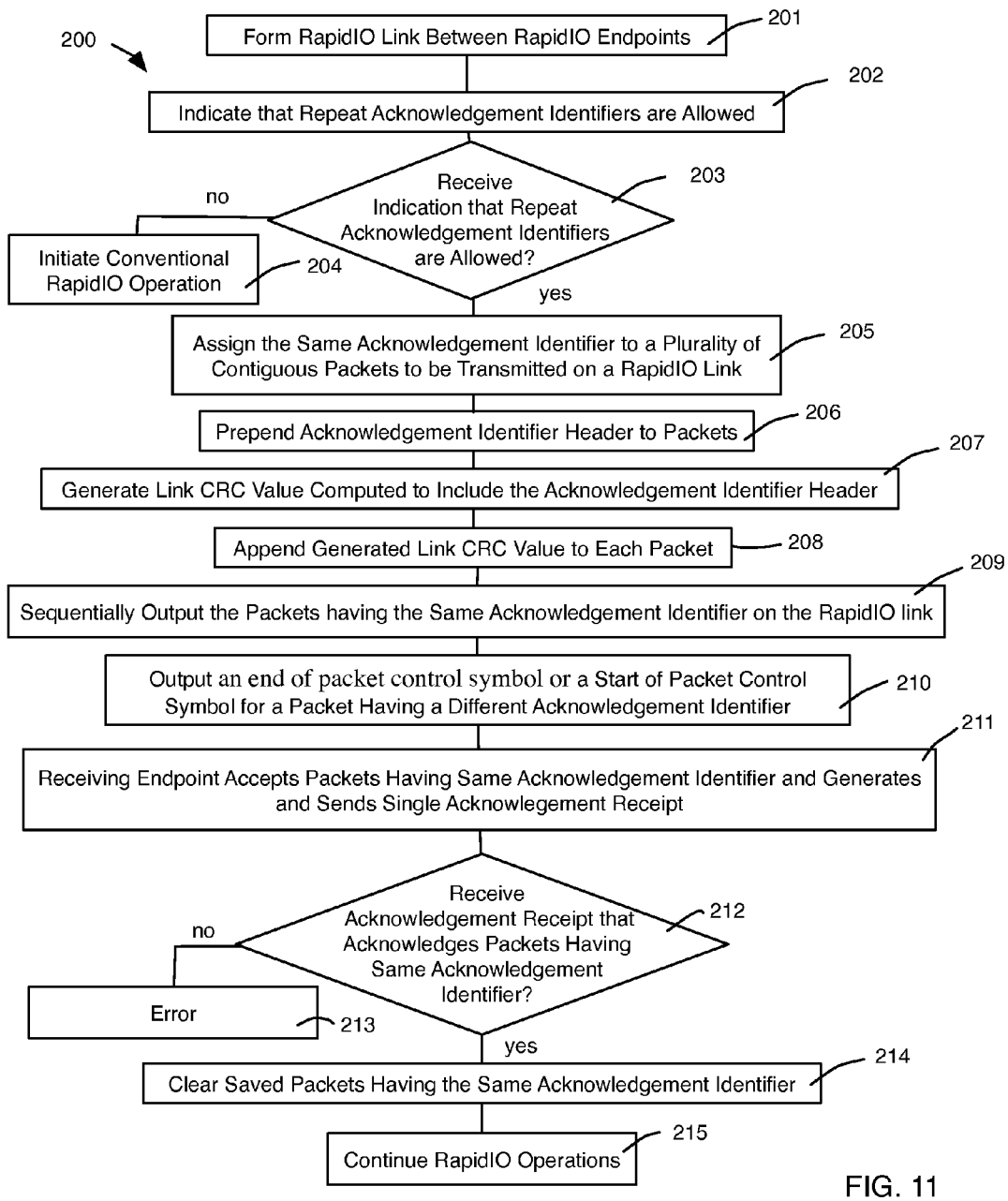
FIG. 11 illustrates a method for communicating packets between RapidIO devices in accordance with an embodiment of the present invention.

In the embodiment shown in FIG. 11, a method 200 for communicating RapidIO packets is shown that includes forming a RapidIO link between a first endpoint and a second endpoint of a RapidIO based communication system as shown by step 201. To establish LP-serial links that include data lanes 6, RapidIO device 1 performs an initialization process in which each port 5 sends an IDLE3 sequence that includes regular Status/Control codewords to form RapidIO links 68-69 on data lanes 51-52 shown in FIG. 9. The Status/Control codewords are sent in pairs to enable error detection. Information in the Status/Control codewords is currently used to automatically negotiate aspects of link operation, such as dynamic link width operation and signal quality optimization.

The method includes indicating that repeat acknowledgement identifiers are allowed as shown by step 202. In the embodiment shown in FIGS. 1-2 RapidIO device 1 is operable to exchange information with other RapidIO devices (e.g., during link initialization) that indicates that repeat acknowledgment identifiers are allowed and is operable to receive indications from other RapidIO devices that repeat acknowledgement identifiers are allowed. More particularly, in the embodiment shown in FIGS. 1-2 port 5 is configured to establish a LP-Serial link with RapidIO endpoints 7 and is configured to indicate to the RapidIO endpoints 7 that repeat acknowledgement identifiers are allowed.

In the present embodiment step 202 is performed during initialization of the RapidIO LP-serial link by sending, between RapidIO device 1 and RapidIO device 2, one or more IDLE3 Status/Control control codeword that indicates that repeat acknowledgement identifiers (ackIDs) are allowed. In the present embodiment, a control symbol is sent from each of RapidIO devices 1 and 2 that includes one or more reserved bit that is set to indicate that repeat acknowledgement identifiers (ackIDs) are allowed. The term "reserved bit" as used in the present application refers to a bit location, indicated to be "reserved" in the RapidIO specification. The selected reserved bit should be one or more bit that is either disregarded or that otherwise does not interfere with normal operation of RapidIO devices 1-2.

Figure 12:
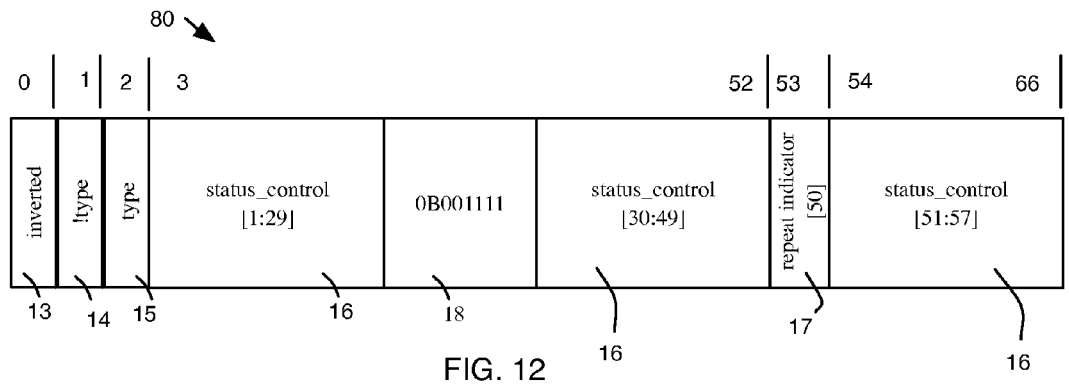
FIG. 12 illustrates a Status/Control control codeword that includes a repeat indicator in accordance with an embodiment of the present invention.

In the embodiment shown in FIG. 12, during each Status/Control ordered sequence one or more Control Symbol 64 Status/Control control codeword 80 is sent having a reserve bit 50 of the status control field (status_control) 16 that is set to a one as a "repeat indicator." This repeat indicator 17 indicates to the receiving endpoint device that repeat acknowledgement identifiers are allowed. Bits 50:57 of the status control field 16 are normally set to zero and are disregarded during normal operation. Accordingly, setting one of bits 50:57 to a "1" will not interfere with normal operation of RapidIO devices 1-2 or any RapidIO devices that do not have the capability of receiving repeat acknowledgement identifiers.

In one embodiment, the indicator of step 201 is stored in a capability register (CAR), or a Command and Status Register (CSR) 8 of RapidIO device 1. For example, the indication can be bits in a register that the RapidIO protocol specifies as "reserved" such as an extended feature indicated in the Session Management Protocol Extended Features Register Block of the session management protocol attribute register of command service register (CSR) 8. Reserved fields in the session management protocol extended features register block are supposed to be set to a value of "0." Indication can be by setting one or more bit indicated to be a reserved bit in RapidIO Annex 2; Session Management Protocol Specification 3.0 to a value of "1".

In one embodiment the indication of step 201 is provided using maintenance transactions. In this embodiment maintenance transactions are used to query a status bit in a register and then set a control bit to turn multiple acknowledgement identifier capabilities on and off. In yet another embodiment, the indication is provided using one or more session management protocol messages (e.g., REQUEST, ADVERTISE, OPEN, ACCEPT REFUSE, FLOW-CONTROL (Flow_Control packets), DATA, CLOSE, STATUS (Message) etc.).

Other mechanisms can also be used to negotiate/control sending multiple packets with the same ackID. For example, the decision to transmit multiple packets with the same ackID can be indicated by register values that indicate the capabilities of each link partner, and controlled by register values set by software. In another embodiment the indication can be a test performed by the first endpoint during the initialization process that generates a response from the second endpoint that indicates whether or not repeat acknowledgement identifiers are allowed. In one embodiment the test includes sending a sequence of packets having the same acknowledgement identifier. If the corresponding control symbols received in response indicate an error, repeat acknowledgement identifiers are not allowed; and if the response does not indicate an error repeat acknowledgement identifiers are allowed.

Referring now to step 203, if an indication that repeat acknowledgement identifiers are allowed is received at the first endpoint, the method proceeds to step 205. Alternatively, conventional RapidIO operation is initiated as shown by step 204, with operation limited by the number of available acknowledgement identifiers. In the present embodiment, conventional operation of RapidIO device 1 consists of operation pursuant to the RapidIO specification as discussed in FIGS. 1-7, with each transmitted packet 42-45 having an acknowledgement identifier that is incremented by one from the acknowledgement identifier of the previous packet.

Figure 14:
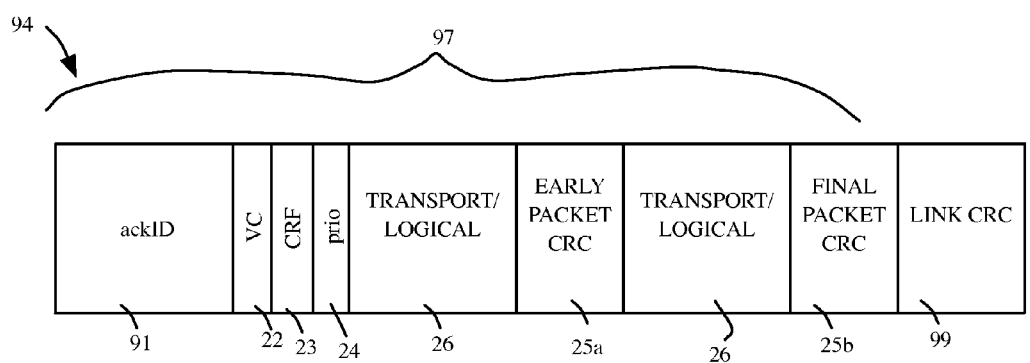
FIG. 14 illustrates a data packet format for a data packet having a packet length, exclusive of CRC, of greater than 80 bytes in accordance with an embodiment of the present invention.

Packet CRC operations are performed as specified in the RapidIO Specification to generate and append a packet CRC value 25 to each of the plurality of packets 62-64 having the same acknowledgement identifier. For packets 90 having a length, exclusive of CRC of 80 bytes or less, packet processing engine 11 is operable to generate and append to the end of transport and logical layer fields 26 a single packet CRC value 25. For packets 94 having a length, exclusive of CRC that is greater than 80 bytes, as shown in FIG. 14, packet processing engine 11 is operable to generate an early packet CRC value 25*a* that is appended after the first 80 bytes and a final packet CRC value 25*b* that is appended to the end of the transport and logical layer fields 26. The final packet CRC value 25*b* is a continuation of the early packet CRC value 25*a*, with the early packet CRC value 25*a* included in the running calculation.

Figure 13:
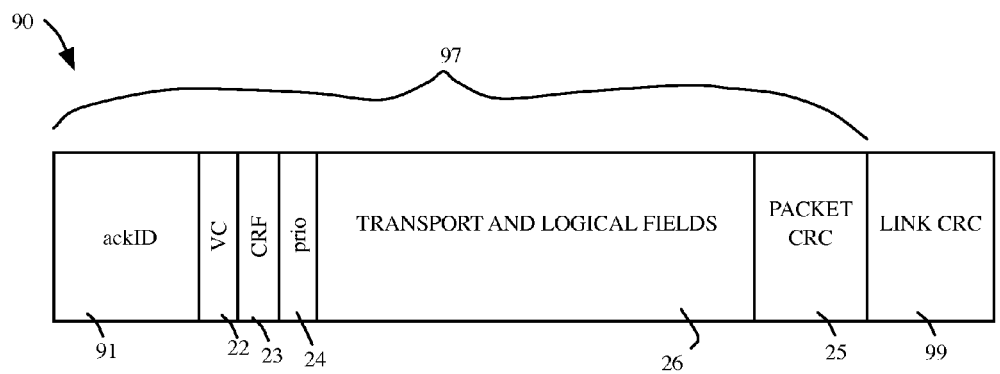
FIG. 13 illustrates a data packet format for a data packet having a packet length, exclusive of CRC, of 80 bytes or less in accordance with an embodiment of the present invention.

As shown by step 205, the same acknowledgement identifier is assigned to a plurality of packets to be transmitted on a RapidIO LP-serial link and corresponding acknowledgement identifier header is prepended to each of the plurality of outgoing packets to be transmitted on the RapidIO LP-Serial link as shown by step 206. In the embodiment shown in FIGS. 1-2 packet processing engine 11 is configured to assign the same acknowledgement identifier to each of the plurality of outgoing packets. More particularly, for each outgoing LP-Serial data packet 90 that includes transport layer fields and logic layer fields 26 shown in FIG. 13 packet processing engine 11 is operable to append a link header that includes acknowledgement identifier header 91 and other link header fields 22-24. The Acknowledgement identifier header 91 is a six bit field that includes either the entire acknowledgement identifier assigned to each outgoing LP-Serial data packet 90 (Control Symbol 24 and Control Symbol 48) or the six least significant bits of the acknowledgement identifier (Control Symbol 64). The acknowledgement identifier for each outgoing LP-Serial data packet 90 in packets 62-64 will be identical, with packets 62-64 including the same acknowledgement identifier header 91. More particularly, the acknowledgement identifier of the first LP-Serial data packet 62 will be the same as that of each of the subsequent data packets in the series of contiguous data packets having the same acknowledgement identifier, and may be referred to hereinafter as a "repeated acknowledgement identifier". In the exemplary embodiment shown in FIG. 9 in which the acknowledgement identifier of the first packet (packet 0) 62 has a value of 801, packets 62-64 will have the same acknowledgement identifier value of 801.

As shown by step 207 a link cyclical redundancy check value is generated for each of the plurality of packets, the link cyclical redundancy check value computed to include the same acknowledgement identifier header. In the embodiment shown in FIGS. 1-2 packet processing engine 11 is configured to generate the link CRC value for each of the plurality of outgoing packets having the same acknowledgement identifier. More particularly, for each outgoing data packet 90 having the same acknowledgement identifier 91, packet processing engine 11 is operable to calculate a link CRC value 95 on the logic layer packet added transport layer fields, packet CRC fields and all of the fields of the link header. Accordingly, the link CRC is calculated on fields 91 and 22-26 shown in FIG. 13 as indicated by bracket 97. Thus, the CRC calculation includes acknowledgement identifier header 91. The link CRC function is a link CRC-32 code, initialized to all logic 1's at the beginning of each packet with the value of the six bits of the acknowledgement identifier header 91 included in the CRC calculation. In the present embodiment the link CRC code is the IEEE 802.3-2008 (Section 1) clause 3.2.9 polynomial.

As shown by step 208 each generated link CRC value is appended to a corresponding packet of the plurality of packets 62-64 having the same acknowledgement identifier. In the present embodiment packet processing engine 11 is operable append the 32-bit generated link CRC value to the packet prior to encoding the resulting data packet 90 using 64 bit/67 bit encoding.

As shown by step 209 the plurality of packets having the same acknowledgement identifier are sequentially output on the RapidIO link. In the embodiment shown in FIGS. 1-2 port 5 is configured to sequentially output the plurality of packets having the same acknowledgement identifier on the RapidIO link More particularly, after steps 205-208 have been performed so as to form corresponding codewords, encoder 9 is configured to encode the codewords and input and output interface 2 is configured to serialize the encoded codewords to form a serial stream and to output the serial stream on the LP-serial link Packet processing engine 11 is also configured to generate control symbols and form corresponding control codewords, encoder 9 is configured to encode the controls codewords, and input and output interface output interface 12 is configured to output the control codewords such that the serial stream output on the serial link includes the control symbols (e.g., control symbols 61 and 67). Port 5 is also configured to store packets 62-64 having the same acknowledgement identifier until a positive acknowledgement has been received.

Port 2 is also operable to generate control symbols 61 and 67 in accordance with the RapidIO protocol. It is appreciated that bit streams 68-69 will include a full stream of packets and control symbols and that FIG. 9 only shows a relevant portion of each bit stream 68-69 in order to not unnecessarily obscure aspects of the present invention. Packets 62-64 are contiguous packets as they are next to each other and together in the sequence of packets 62-64, with each packet 62-64 adjacent to one or more other packet 62-64 having the same acknowledgement identifier, and no packets in the sequence of packets 62-64 having a different acknowledgement identifier. The term "contiguous packets" as used in the present application refers to the relationship between packets and not control symbols, and it is appreciated that one or more control symbols 61 may extend between contiguous packets 62-64 and within one or more of contiguous packets 62-64.

Though packets 62-64 are shown in FIG. 9 as transmitted on a single data lane 51, it is appreciated that, in a N× mode of operation, packets 62-64 could be striped across multiple data lanes 6, with packets 62-64 contiguous as they are next to each other and together in the sequence of packets transmitted over the RapidIO link between RapidIO device 1 and RapidIO device 2.

As shown by step 210 an end of packet control symbol or a start of packet control symbol for a packet 65 having a different acknowledgement identifier is output over the RapidIO link After sending the last packet 64 of the packets 62-64 having the same acknowledgement identifier, if port 5 does not have any other outgoing packet that needs to be sent, an end of packet control symbol 67 is sent that indicates the end of the sequence of packets having the same acknowledgement identifier. The end of packet control symbol can be Control Symbol 64 End-of-packet-unpadded control symbol or a Control Symbol 64 End-of-packet-padded control symbol that includes the packet delimiter for the last packet 64 of the packets 62-64 having the same acknowledgement identifier. The end of packet control symbol can have the format shown in FIG. 3, with an stype1 field of 0×10 to indicate an End-of-packet-unpadded control symbol or stype1 field of 0×11 to indicate an End-of-packet-padded control symbol.

After sending the last packet 64 of the packets 62-64 having the same acknowledgement identifier, if port 5 does have an outgoing packet that needs to be sent, the control symbol 67 following the last packet 64 will not be a end of packet control symbol but will rather be a start of packet control symbol for the following packet (e.g., packet 65) that will have a different acknowledgement identifier. This different acknowledgement identifier will have a value that is one greater than the same acknowledgement identifier (e.g., an ackID value of 802 which is one more than the ackID value of 801 of packets 62-64).

The receipt of either the end of packet control symbol 67 or the subsequent packet 65 having a different acknowledgement identifier at a receiving endpoint (RapidIO device 2), immediately after receiving the series of packets having the same acknowledgement identifier, indicates the end of the sequence of packets having the same acknowledgement identifier to the receiving endpoint (RapidIO device 2).

RapidIO device 2 is operable upon receiving the indication from RapidIO device 1 that repeat acknowledgement identifiers are allowed, followed by receiving a plurality of packets having the same acknowledgement identifier, and followed by either an end of packet control symbol or a start of packet control symbol for a subsequent packet having a different acknowledgement identifier, to accept the packets 62-64 having the same acknowledgement identifier and to generate and send a single acknowledgement receipt as shown by step 211. More particularly, in one embodiment RapidIO device 2 is operable for removing the added packet headers and cyclical redundancy check values; performing a cyclical redundancy check on each of the packets having the same acknowledgement identifier, with the CRC of each packet computed to include the same acknowledgement identifier header; and passing all of the packets having the same acknowledgement identifier to a switch fabric of RapidIO device 2 when the cyclical redundancy check on each of the packets 62-64 does not indicate an error. In the present embodiment the CRC is performed as packets 62-64 are received with packets that pass the check stored until all packets 62-64 having the same acknowledgement identifier have been received and checked. A failure of the CRC is operable to generate an error message, necessitating that all of the transmitted packets 62-64 having the same acknowledgement identifier be resent.

Because the value of the same acknowledgement identifier header is included in the link CRC calculation for each of the transmitted packets 62-64, the CRC of each packet 62-64 ensures that all of packets 62-64 are correctly received.

As shown by steps 211 and 213, if the acknowledgement receipt for the packets having the same acknowledgement identifier is not received an error has occurred and a corresponding control symbol that indicates the error will be sent to endpoint device (RapidIO device 1) that sent the packets 62-64. The first endpoint device (RapidIO device 1 will then resend packets 62-64).

RapidIO device 2 is operable to send the single acknowledgement receipt (e.g., packet accepted control symbol 70) that acknowledges packets 62-64. In the event of an error a corresponding error message (e.g., a negative acknowledgement that includes the same acknowledgement identifier) is sent to RapidIO device 1. Packets 62-64 are discarded, and must be resent.

Figure 10:
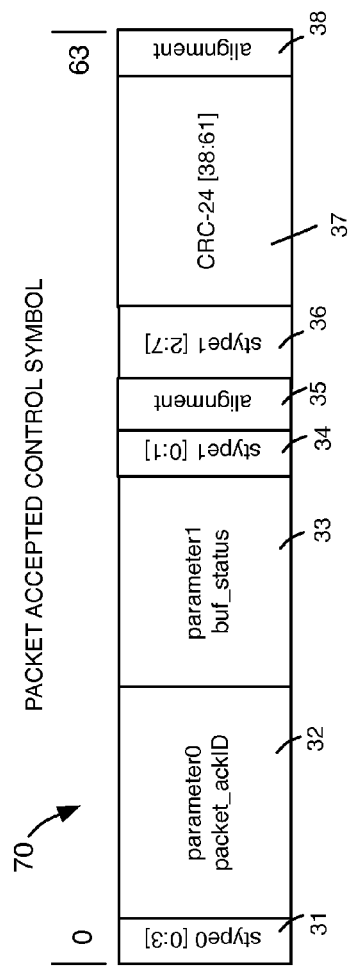
FIG. 10 illustrates a packet accepted control symbol in accordance with an embodiment of the present invention.

FIG. 10 shows the format of an exemplary packet accepted control symbol 70 to include a parameter0 field 32 that includes the same acknowledgement identifier included in packets (packet 0-packet n) 62-64, which in the present example has a decimal value of 801. In addition, packet accepted control symbol 70 includes a parameter1 field that specifies the buffer status of the transmitting port of RapidIO device 2, a stype1 field 34, alignment bits 35 and 38, and a CRC value 37 computed as specified in the RapidIO specification.

To avoid pathological cases where packets are sent with small gaps between them, causing acknowledgement identifiers to be consumed too quickly, a "minimum acknowledgement identifier burst size" control is used to delay termination of a sequence of packets by filling the link with Status and/or VC Status control symbols prior to sending an end of packet control symbol, or beginning a new packet with a new acknowledgement identifier. The "minimum acknowledgement identifier burst size" sets the fastest rate that acknowledgement identifiers can be consumed. In one embodiment the minimum acknowledgement burst size is a predetermined value that is stored in RapidIO device 1 that can be programmed by a user of RapidIO device 1, with port 5 configured to determine the number of contiguous packets transmitted having the same acknowledgement identifier value and compare the determined number of contiguous packets transmitted having the same acknowledgement identifier value to a minimum acknowledgement identifier burst size value, and when the determined number of contiguous packets transmitted having the same acknowledgement identifier value is less than or equal to the minimum acknowledgement identifier burst size value to delay sending an end of packet control symbol or a packet having a different acknowledgement identifier by sending one or more Status or VC Status control symbols. This allows the user to change the minimum acknowledgement burst size to accommodate the link length and speed of a particular operating environment of RapidIO device 1. For example, in environments having high speed and long link length, a higher minimum acknowledgement burst size is used to assure a sufficient number of acknowledgement identifiers are available.

In one embodiment the burst size of packets having the same acknowledgement identifier is controlled by a "burst maximum packet data size" that sets the maximum amount of packet data that will be included in any single burst of packets having the same acknowledgement identifier. In one embodiment the burst maximum packet data size is a predetermined value that is stored in RapidIO device 1 that can be programmed by a user of RapidIO device 1, with port 5 configured to determine the amount of packet data in the contiguous packets transmitted having the same acknowledgement identifier value and compare the determined amount of packet data in the contiguous packets transmitted having the same acknowledgement identifier value to a burst maximum packet data size value, and when the determined amount of packet data in the contiguous packets transmitted having the same acknowledgement identifier value is equal to the burst maximum packet data size value to send an end of packet control symbol or a packet having a different acknowledgement identifier. This allows the user to change the amount of packet data is each burst having the same acknowledgement identifier to accommodate the link length and speed of a particular operating environment of RapidIO device 1.

As shown by step 212-214 of FIG. 11, when the acknowledgement receipt is received that acknowledges the plurality of packets having the same acknowledgement identifier the saved packets having the same acknowledgement identifier are cleared. More particularly, upon receiving the acknowledgement receipt, RapidIO device 1 clears the stored packets 62-64 and continues RapidIO operations as shown by step 215. In the present embodiment the single acknowledgement receipt is a single packet accepted control symbol received at RapidIO device 1 conforming to a format of the RapidIO specification and including the same acknowledgement identifier (e.g., an acknowledgement identifier having a decimal value of 801). In the present embodiment, continuation of operations as shown by step 215 includes repeating steps 205-214 during operation of devices 1-2 each time that a new acknowledgement identifier is required.

Though the invention is described above with reference to IDLE3/Control System 64 links, the links could also include IDLE1/Control System 24 links or IDLE2/Control Symbol 48 links. More particularly, device 1 can configure one or more ports 5 to be IDLE1/Control Symbol 24 ports, and one or more or more ports 5 to be IDLE2/Control System 48 ports and one or more ports 5 to be Idle3/Control Symbol 64 ports and can simultaneously transmit and receive over Idle1, Idle2 and Idle3 links. In Idle1/Control Symbol 24 acknowledgement identifier header bits is a six-bit value, with the leftmost five bits of the acknowledgement identifier header field being the acknowledgement identifier and the rightmost bit being a logical 0 (0b0). In this embodiment, all six bits of the acknowledgement identifier header field 21 are used in calculating the link CRC in step 207.

In Idle2/Control Symbol 48 each acknowledgement identifier is a six-bit value, with all six bits included in the acknowledgement identifier header field 21. In this embodiment all six bits of the acknowledgement identifier are used in calculating the link CRC in step 207.

The maximum length of RapidIO links has previously been limited by the number of acknowledgement identifiers that can be used to track packet delivery. The method and apparatus of the present invention removes this limitation, allowing for increased line speed and allowing the length of RapidIO links to be longer than is possible using conventional devices that conform to the current RapidIO specification. Because the method and apparatus of the present invention does not increase the size of the acknowledgement identifiers, bandwidth efficiency is not reduced. Accordingly, the method and apparatus of the present invention provides bandwidth efficient communication over a RapidIO communication system.

Although the invention has been described with reference to particular embodiments thereof, it will be apparent to one of ordinary skill in the art that modifications to the described embodiment may be made without departing from the spirit of the invention. Accordingly, the scope of the invention will be defined by the attached claims not by the above detailed description.

What is claimed is:

1. A RapidIO device comprising:
a switch fabric; and
a port coupled to the switch fabric, the port configured to establish a serial link with RapidIO endpoints, configured to assign the same acknowledgement identifier to three or more contiguous packets and generate a link cyclical redundancy check (CRC) value for each of the three or more contiguous packets that is computed to include the value of an acknowledgement identifier header prepended to each of the three or more contiguous packets, and the port configured to append each link CRC value to a corresponding one of the three or more contiguous packets and sequentially output the three or more contiguous packets having the same acknowledgement identifier on the serial link.

2. The RapidIO device of claim 1 wherein the port is configured to indicate to the RapidIO endpoints that repeat acknowledgement identifiers are allowed.

3. The RapidIO device of claim 1 wherein the RapidIO device is operable to exchange information with other RapidIO devices during link initialization that indicates that repeat acknowledgment identifiers are allowed.

4. The RapidIO device of claim 3 wherein the RapidIO device is operable to send a status/control control codeword that indicates that repeat acknowledgment identifiers are allowed.

5. The RapidIO device of claim 1 wherein the port further includes:
a packet processing engine configured to assign the same acknowledgement identifier to each of the three or more contiguous packets, prepend the acknowledgement identifier header to each of the three or more contiguous packets having the same acknowledgement identifier and generate the link CRC value for each of the three or more contiguous packets having the same acknowledgement identifier to generate a plurality of codewords;
an encoder coupled to the packet processing engine and configured to encode the plurality of codewords; and
an input and output interface coupled to the encoder and configured to serialize the encoded codewords to form a serial stream, the input and output interface configured to output the serial stream on the serial link.

6. The RapidIO device of claim 5 wherein the packet processing engine is configured to generate control codewords that include one or more control symbol and the input and output interface is configured to output the control codewords such that the serial stream output on the serial link includes the control symbols, the control symbols including a control codeword that is sent following the last packet of the plurality of packets having the same acknowledgement identifier that includes either an end of packet control symbol or that includes a start of packet control symbol for a following packet having a different acknowledgement identifier.

7. The RapidIO device of claim 1 wherein the port is operable, upon sequentially receiving three or more packets having the same acknowledgement identifier from a endpoint device that has indicated that repeat acknowledgement identifiers are allowed, to accept the three or more packets having the same acknowledgement identifier, generate a single acknowledgement that includes the same acknowledgement identifier and send the single acknowledgement to the endpoint device that that sent the three or more contiguous packets having the same acknowledgement identifier.

8. The method of claim 7 wherein the single acknowledgement comprises a packet accepted control symbol.

9. The RapidIO device of claim 1 wherein the port is configured to determine the number of contiguous packets transmitted having the same acknowledgement identifier value and compare the determined number of contiguous packets transmitted having the same acknowledgement identifier value to a minimum acknowledgement identifier burst size value, and when the determined number of contiguous packets transmitted having the same acknowledgement identifier value is less than or equal to the minimum acknowledgement identifier burst size value the port is configured to delay sending an end of packet control symbol or a packet having a different acknowledgement identifier by sending one or more Status or VC Status control symbols.

10. A method of formatting bit streams in a RapidIO based communication system, the method comprising:
performing an initialization process so as to form a RapidIO link between a first endpoint and a second endpoint of the RapidIO based communication system;
formatting a first RapidIO bit stream at the first endpoint of the RapidIO communication system to include three or more contiguous packets having the same acknowledgement identifier, each of the three or more contiguous packets including an acknowledgement identifier header and a link CRC value computed to include the value of the packet's acknowledgement identifier header; and
formatting a second RapidIO bit stream at the second endpoint of the RapidIO communication system to include a single packet accepted control symbol that acknowledges all of the three or more contiguous packets having the same acknowledgement identifier.

11. The method of claim 10 further comprising:
receiving at the first endpoint an indication that repeat acknowledgement identifiers are allowed.

12. The method of claim 11 further comprising:
indicating to the second endpoint that repeat acknowledgement identifiers are allowed by sending a status/control control symbol to the second endpoint, the receiving at the first endpoint an indication that repeat acknowledgement identifiers are allowed including receiving from the second endpoint a status/control codeword that indicates that repeat acknowledgement identifiers are allowed.

13. The method of claim 10 wherein the single packet accepted control symbol includes the same acknowledgement identifier, the transport and logical fields of the plurality of packets conforming to packet format as specified in Rev. 3.0 or later of the RapidIO Interconnect Specification.

14. A method for communicating RapidIO packets comprising:
receiving an indication that repeat acknowledgement identifiers are allowed;
assigning the same acknowledgement identifier to each of three or more packets to be sequentially transmitted on a RapidIO serial link;
prepending an acknowledgement identifier header to each of the three or more packets to be sequentially transmitted on a RapidIO serial link;
generating a link cyclical redundancy check (CRC) value for each of the three or more packets, the link CRC value computed to include the acknowledgement identifier header prepended to each of the three or more packets;
appending each generated link CRC value to a corresponding packet of the plurality of packets having the same acknowledgement identifier; and
sequentially outputting the three or more packets having the same acknowledgement identifier on the RapidIO serial link.

15. The method of claim 14 further comprising:
indicating that repeat acknowledgement identifiers are allowed.

16. The method of claim 15 wherein, the indicating that repeat acknowledgement identifiers are allowed further comprises sending over the RapidIO serial link a status/control control codeword, that indicates that repeat acknowledgement identifiers are allowed and that conforms to a format of the RapidIO specification.

17. The method of claim 15 wherein the indicating that repeat acknowledgement identifiers are allowed includes sending one or more control symbol having a data field defined to be a reserved data field in the RapidIO specification that includes one or more bit that are set to indicate that repeat acknowledgement identifiers are allowed.

18. The method of claim 14 wherein the CRC code used to calculate the link CRC value is the IEEE 802.3-2008 (Section 1) clause 3.2.9 polynomial, the CRC code computed to include all of the link header, transport and logical fields, and packet CRC fields of a corresponding one of each of the plurality of packets.

19. The method of claim 14 further comprising:
receiving a single acknowledgement receipt that acknowledges the three or more packets having the same acknowledgement identifier.

20. The method of claim 14 further comprising:
receiving over a RapidIO serial link an indication that repeat acknowledgement identifiers are allowed;
sequentially receiving three or more packets having the same acknowledgement identifier over the RapidIO LP-serial link;
accepting each of the plurality of packets having the same acknowledgement identifier; and
sending a single acknowledgement receipt that acknowledges the plurality of packets having the same acknowledgement identifier.

21. The method of claim 20 wherein the accepting each of the three or more packets having the same acknowledgement identifier further comprises removing the appended packet headers and link cyclical redundancy code and performing a cyclical redundancy check on each of the three or more packets having the same acknowledgement identifier, and passing all of the three or more packets having the same acknowledgement identifier to a switch fabric of a RapidIO device when the cyclical redundancy check on each of the three or more packets having the same acknowledgement identifier does not indicate an error.

* * * * *